United States Patent
Yamagishi et al.

(10) Patent No.: US 11,095,187 B2
(45) Date of Patent: Aug. 17, 2021

(54) ROTARY ELECTRIC MACHINE

(71) Applicant: TOYOTA JIDOSHA KABUSHIKI KAISHA, Toyota (JP)

(72) Inventors: Yoshitada Yamagishi, Okazaki (JP); Takayori Sakakibara, Toyokawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 487 days.

(21) Appl. No.: 16/039,438

(22) Filed: Jul. 19, 2018

(65) Prior Publication Data
US 2019/0036416 A1 Jan. 31, 2019

(30) Foreign Application Priority Data

Jul. 25, 2017 (JP) ............................. JP2017-143861

(51) Int. Cl.
| | |
|---|---|
| *H02K 1/12* | (2006.01) |
| *H02K 5/24* | (2006.01) |
| *H02K 1/18* | (2006.01) |
| *H02K 5/22* | (2006.01) |

(52) U.S. Cl.
CPC ................ *H02K 5/24* (2013.01); *H02K 1/12* (2013.01); *H02K 1/185* (2013.01); *H02K 5/225* (2013.01)

(58) Field of Classification Search
CPC .......... H02K 5/24; H02K 1/185; H02K 5/225; H02K 1/12; H02K 3/50; H02K 3/522; H02K 11/014
See application file for complete search history.

(56) References Cited

U.S. PATENT DOCUMENTS

| | | | |
|---|---|---|---|
| 2012/0126641 A1* | 5/2012 | Murakami | H02K 9/19 310/54 |
| 2016/0036291 A1* | 2/2016 | Yabe | H02K 1/185 310/89 |
| 2017/0012486 A1 | 1/2017 | Yamagishi | |
| 2017/0141628 A1* | 5/2017 | Nose | H02K 1/278 |
| 2017/0170700 A1* | 6/2017 | Samp | H02K 5/24 |

FOREIGN PATENT DOCUMENTS

| | | |
|---|---|---|
| CN | 106340988 A | 1/2017 |
| JP | H03-86757 U | 9/1991 |
| JP | 2007-306751 A | 11/2007 |
| JP | 2008-289244 A | 11/2008 |
| JP | 2012-065401 A | 3/2012 |
| JP | 2016-144219 A | 8/2013 |
| JP | 2017-022851 A | 1/2017 |
| JP | 2017-060247 A | 3/2017 |
| JP | 2017-127132 A | 7/2017 |

* cited by examiner

*Primary Examiner* — Tulsidas C Patel
*Assistant Examiner* — Riley O Stout
(74) *Attorney, Agent, or Firm* — Oliff PLC (57) ABSTRACT

A rotary electric machine includes a stator, a rotor, a case having two or more seat portions on which portions of a stator core are seated, and a reinforcement plate disposed on the top surface of the stator core. The stator core includes two or more attachment portions that are seated and fixed on the seat portions. The reinforcement plate is less likely to flex in the axial direction than the steel sheets, and is fixed on the top surface of the stator core so as to extend over at least two of the attachment portions.

15 Claims, 6 Drawing Sheets

ROTARY ELECTRIC MACHINE

CROSS REFERENCE TO RELATED APPLICATION

The disclosure of Japanese Patent Application No. 2017-143861 filed on Jul. 25, 2017 including the specification, claims, drawings, and abstract is incorporated herein by reference in its entirety.

TECHNICAL FIELD

The present specification discloses a rotary electric machine including a stator and a rotor that are housed in a case.

BACKGROUND

In a typical rotary electric machine, a stator is housed in a case and is fixed by means of, for example, bolts. For example, JP 2008-289244 A discloses a rotary electric machine having a stator bolted to a case. More specifically, a stator core disclosed in JP 2008-289244 A has three flange portions projecting from the circumferential edge of the stator core outward in the radial direction, each of the flange portions having a bolt insertion hole. The stator core is screwed to the case with the bolts that are inserted into the bolt insertion holes. In other words, JP 2008-289244 A discloses a structure wherein a plurality of fastening points (fixing points) between the stator core and the case are spaced apart and dispersed in the circumferential direction.

A structure wherein a plurality of fixing points between the stator core and the case are spaced apart and dispersed in the circumferential direction as disclosed in JP 2008-289244 A may suffer from vibration of the stator core at positions away from the fixing points.

A typical stator core is composed of a plurality of stacked steel sheets. The steel sheets are thin relative to their diameter and tend to flex in the axial direction due to, for example, vibration. A structure wherein the fixing points of the stator core are dispersed, therefore, has caused a situation in which, while the steel sheets do not flex in portions of the stator core that are near the fixing points, the steel sheets flex and vibrate at positions away from the fixing points. Such vibration of the stator core may cause, for example, deterioration of a component such as a lead wire that is attached to the stator.

To address this situation, the present specification discloses a rotary electric machine that can further suppress vibration of the stator core.

SUMMARY

The present specification discloses a rotary electric machine that includes a stator, a rotor, a case, and a reinforcement plate. The stator includes a stator core composed of a plurality of steel sheets stacked in an axial direction and a stator coil wound on the stator core. The rotor is disposed to be concentric with the stator. The case houses the stator and the rotor, and has two or more seat portions on which portions of the stator core are seated. The reinforcement plate is fixed to a first end of the stator core as viewed in the axial direction. The stator core includes two or more attachment portions disposed at an interval in a circumferential direction, the two or more attachment portions being seated and fixed on the seat portions. The reinforcement plate is less likely to flex in the axial direction than the steel sheets, and is fixed on the first end of the stator core as viewed in the axial direction so as to extend over at least two of the attachment portions.

With this structure, because the first end of the stator core as viewed in the axial direction is pressed by the reinforcement plate that is less likely to flex, flexure of the steel sheets that form the stator core toward the first end as viewed in the axial direction can be suppressed, and, in turn, vibration of the stator core can be suppressed.

In an embodiment, the rotary electric machine further includes a terminal base attached to the case; and a plurality of lead wires that extend from a coil end of the stator coil located toward the first end as viewed in the axial direction and are joined to the terminal base, wherein the plurality of lead wires extend from the coil end in an extension range located between two seat portions that are adjacent to each other in the circumferential direction, and wherein the reinforcement plate spans the extension range.

As the reinforcement plate spans the extension range, vibration of the stator core near the extension range is suppressed. With this structure, stress applied to the lead wires which is caused by vibration of the stator core can be reduced, and deterioration or poor connection of the lead wires can be prevented effectively.

In an embodiment, the seat portions are projections partially projecting from an opposing surface of the case that faces a surface on a second end of the stator core as viewed in the axial direction, and a portion of the surface on the second end of the stator core as viewed in the axial direction is spaced apart from the opposing surface of the case.

As a portion of the surface on the second end of the stator core as viewed in the axial direction is spaced apart from the opposing surface of the case, the contact area of the stator core and the case can be reduced, and the amount of vibration and noise transfer between the stator core and the case can be reduced.

In an embodiment, the rotary electric machine further includes a support plate that is less likely to flex in the axial direction than the steel sheets, wherein the support plate is disposed opposite the reinforcement plate in the axial direction with the stator core interposed therebetween so that the stator core is pressed between the support plate and the reinforcement plate, the support plate having a portion that is fixed to the opposing surface of the case.

As the stator core is pressed between the reinforcement plate and the support plate, vibration of the stator core is prevented more effectively.

In an embodiment, a range corresponding to the support plate as viewed in the circumferential direction is approximately the same as a range corresponding to the extension range as viewed in the circumferential direction.

As a range corresponding to the support plate as viewed in the circumferential direction is approximately the same as the extension range where vibration should be particularly suppressed, the contact area of the support plate and the stator core can be reduced, and vibration and noise transfer between the stator core and the case via the support plate can be reduced.

In an embodiment, the reinforcement plate has a substantially arcuate shape that extends over the two seat portions located on both sides of the extension range as viewed in the circumferential direction.

As the reinforcement plate has an arcuate shape extending only along a portion of the circumference rather than a substantially annular shape extending along the entire circumference, material and cost can be reduced.

In an embodiment, the reinforcement plate is curved in the circumferential direction under no load such that the reinforcement plate is convex toward a first side as viewed in the thickness direction, and the reinforcement plate is fixed such that a surface of the reinforcement plate located on the first side as viewed in the thickness direction is in contact with the stator core.

With this structure, attaching the reinforcement plate to the stator core to bring both ends of the reinforcement plate that are curved upward into close contact with the stator core spontaneously turns the entire reinforcement plate into a correct shape that comes in contact with the top surface of the stator core. In other words, the above-described structure can bring the entire reinforcement plate in contact with the top surface of the stator core without keeping the flatness of the reinforcement plate at a high level.

In the rotary electric machine disclosed in the present specification, because a first end of the stator core as viewed in the axial direction is pressed by the reinforcement plate that is less likely to flex, flexure of the steel sheets that form the stator core toward the first end as viewed in the axial direction can be suppressed, and, in turn, vibration of the stator core can be suppressed.

BRIEF DESCRIPTION OF DRAWINGS

Embodiments of the present disclosure will be described by reference to the following figures, wherein.

DESCRIPTION OF EMBODIMENTS

Figure 1:
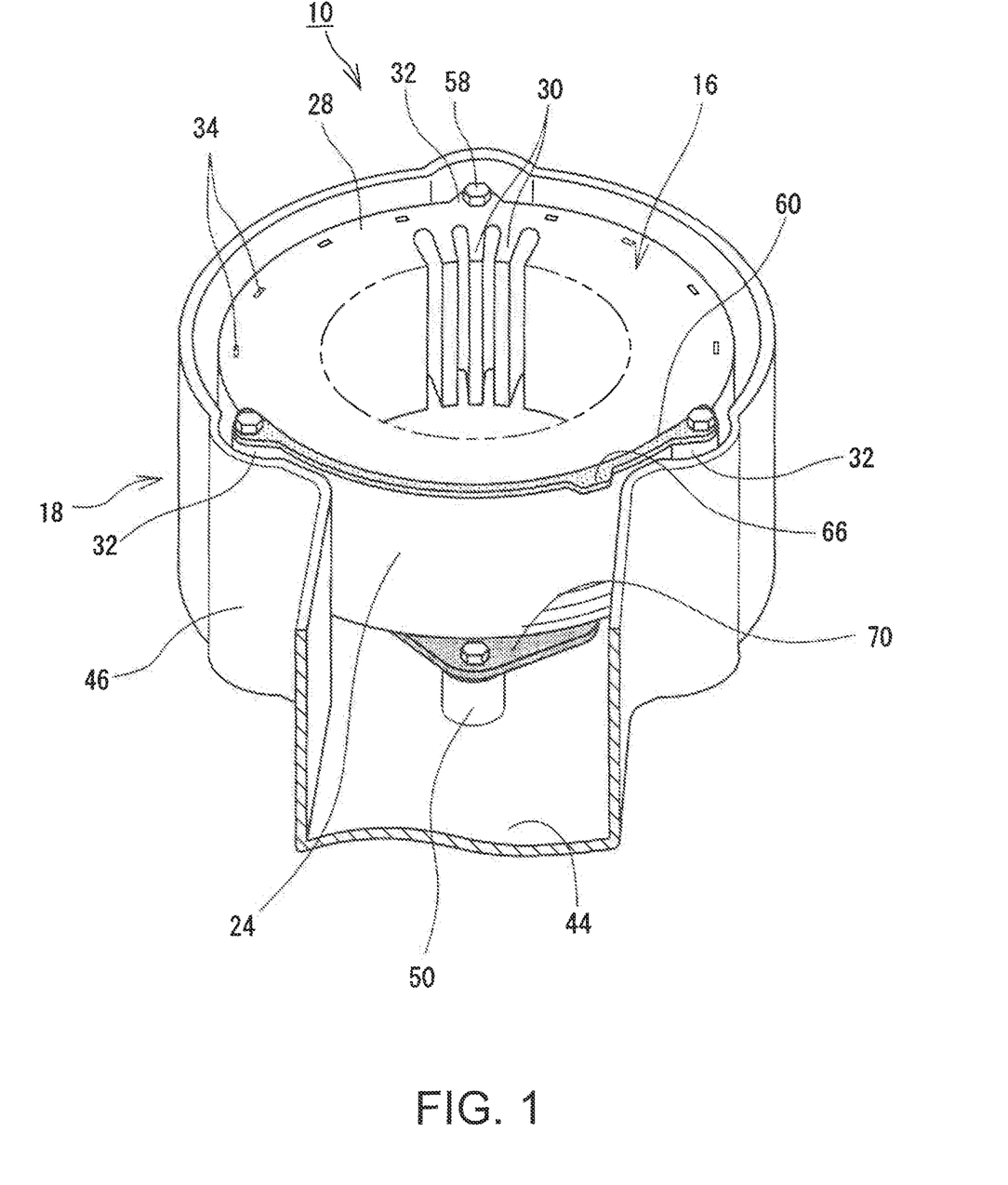
FIG. 1 is a perspective view of a rotary electric machine.
Figure 2:
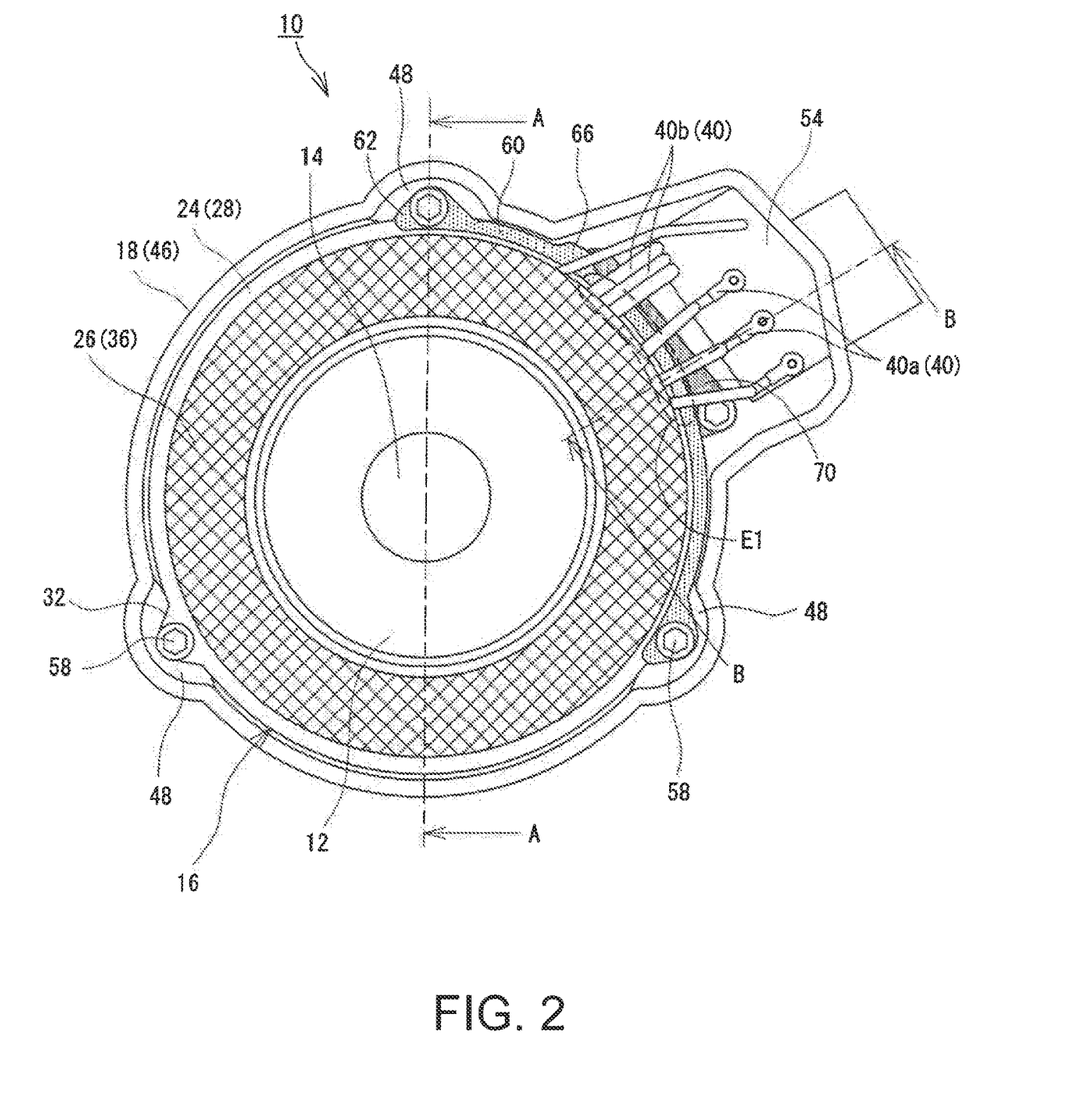
FIG. 2 is a top view of the rotary electric machine.
Figure 3:
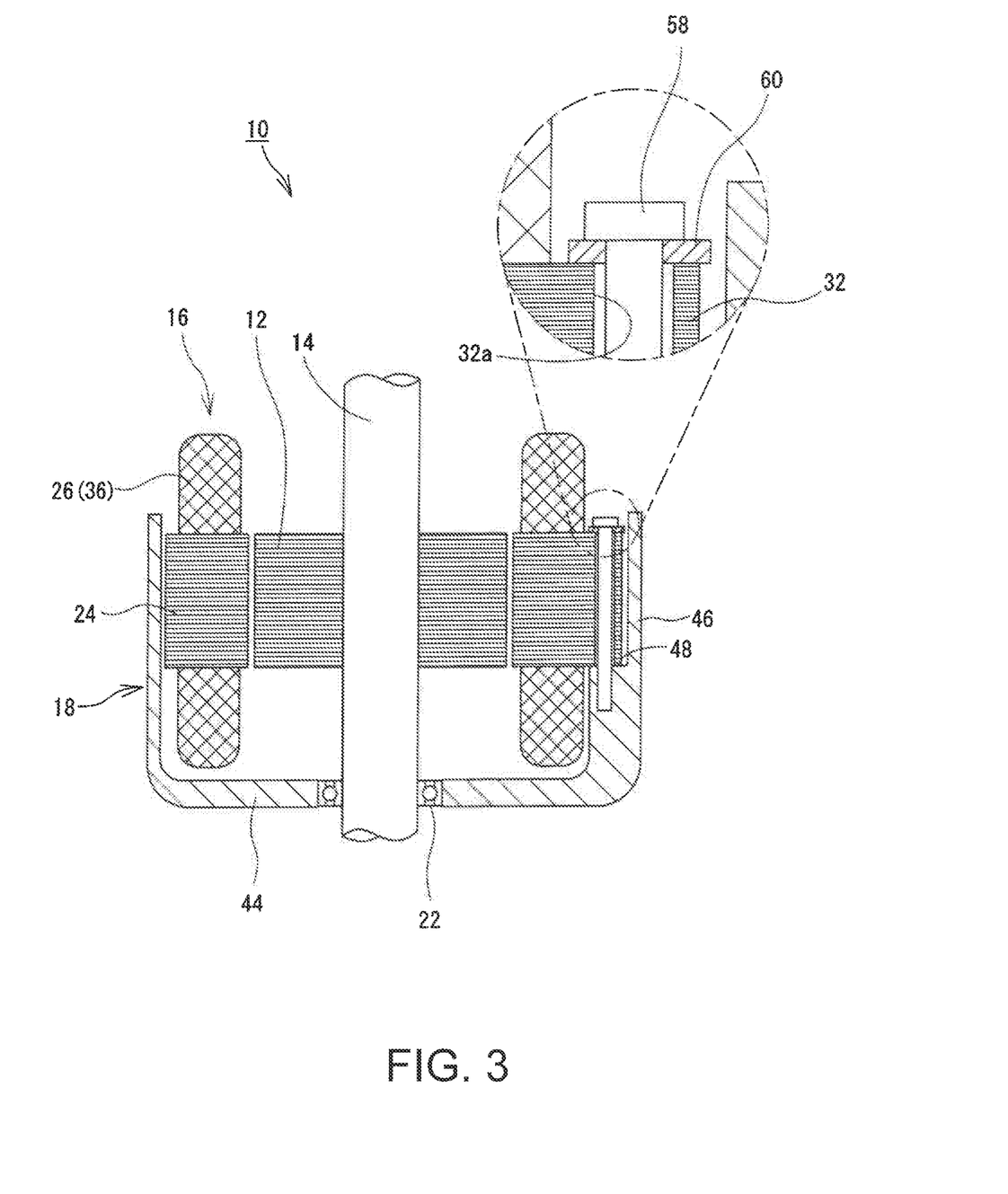
FIG. 3 illustrates a cross section A-A in FIG. 2.
Figure 4:
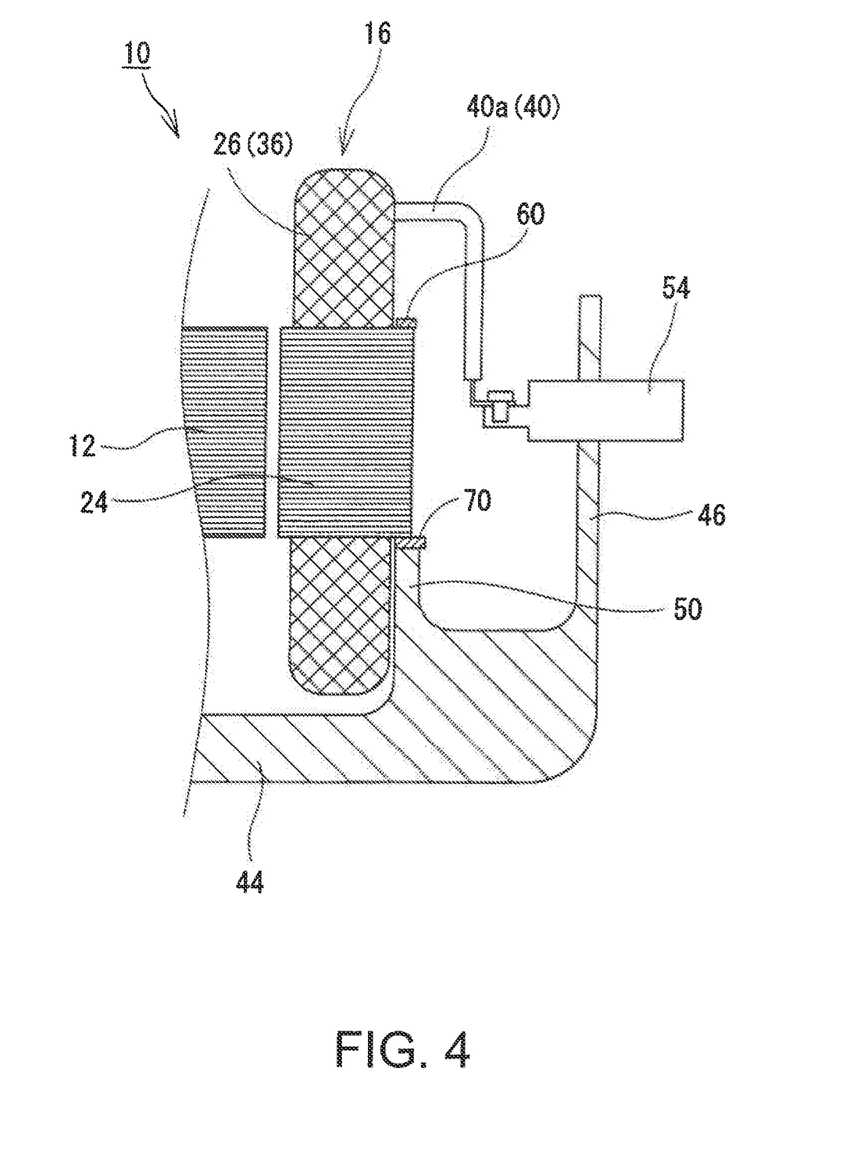
FIG. 4 illustrates a cross section B-B in FIG. 2.

A structure of a rotary electric machine 10 will be described below with reference to the accompanying drawings. FIG. 1 is a perspective view of the rotary electric machine 10, and FIG. 2 is a top view of the rotary electric machine 10. FIG. 3 illustrates a cross section A-A in FIG. 2, and FIG. 4 illustrates a cross section B-B in FIG. 2. For ease of reference, some components are not illustrated where appropriate. In FIG. 1, for example, a case cover, a stator coil 26, and a rotor 12 are not illustrated. In FIG. 2, the case cover is not illustrated. In the following description, one end side of the rotary electric machine 10 as viewed in the axial direction is referred to as "upper side" or "lead wire side," and the other end side of the rotary electric machine 10 as viewed in the axial direction is referred to as "lower side" or "counter-lead wire side"; however, this is unrelated to the direction of actual gravity. As such, the rotary electric machine 10 may be mounted in a posture such that its axial direction is approximately perpendicular to the direction of gravity.

The rotary electric machine 10 may function as an electric motor or may function as a generator. While the rotary electric machine 10 may be mounted to any device, the rotary electric machine 10 disclosed in the present specification is suitably mounted to devices in which vibration tends to occur, as the rotary electric machine 10 has a high resistance to vibration. As such, the rotary electric machine 10 disclosed in the present specification is suitably mounted in, for example, an electrically powered vehicle, either as an electric motor for producing power for driving the vehicle or as a generator for generating electricity from excess power of the engine or regenerative power.

The rotary electric machine 10 includes a rotary electric machine body and a motor case that houses the rotary electric machine body. The rotary electric machine body includes a rotor 12, a rotating shaft 14, and a stator 16. The rotor 12 includes, for example, a rotor core and a plurality of permanent magnets (magnetic poles, which are not illustrated) embedded in the rotor core, and the rotating shaft 14 is secured to the center of the rotor core. The rotating shaft 14 is supported via bearings 22, and is freely rotatable along with the rotor 12.

The stator 16 having a substantially annular shape is disposed around the rotor 12 to be concentric with the rotor 12. The stator 16 includes a stator core 24 and a stator coil 26 wound on the stator core 24. The stator core 24 is composed of a plurality of steel sheets such as electromagnetic steel sheets stacked in the axial direction. Each of the steel sheets is very thin and has a thickness of, for example, from 0.1 mm to 1 mm, and more preferably from 0.2 mm to 0.5 mm. The plurality of steel sheets are swaged by swage portions 34 that are formed in a yoke 28.

Portions of the stator core 24 composed of the plurality of steel sheets are roughly classified into the yoke 28 having an annular shape, a plurality of teeth 30 projecting from the inner circumferential edge of the yoke 28, and a plurality of (in the illustrated example, three) attachment portions 32 projecting from the outer circumferential edge of the yoke 28. In the yoke 28, as described above, the plurality of swage portions 34 for joining the plurality of steel sheets together are formed at even intervals in the circumferential direction. The three attachment portions 32, each having a substantially chevron-like shape as viewed in a top view, project from the outer circumferential edge of the yoke 28 at intervals of 120 degrees. The attachment portions 32 are portions by which the stator 16 is fixed in a state in which they are seated on seat portions 48 of a lower case 18. Each of the attachment portions 32 has a fastening hole 32a that penetrates in the axial direction, and a fastening bolt 58 is inserted through the fastening hole 32a. Although three attachment portions 32 are provided in the illustrated example, the number of the attachment portions 32 may be any number that is greater than or equal to 2.

The stator coil 26 is wound around the teeth 30 of the stator core 24. The stator coil 26 includes coils of three phases; that is, U-phase coils, V-phase coils, and W-phase coils. As an alternating current is applied to the three-phase coils, a rotating magnetic field is formed, to cause the rotor 12 to rotate. The three-phase coils are wound, for example, in a distributed manner and are star-connected. A portion of the stator coil 26 projects from each end of the stator core 24 as viewed in the axial direction and forms a coil end 36.

A plurality of lead wires 40 extend from the lead wire-side (upper-side) coil end 36. The lead wires 40 relay between a connection terminal provided on a terminal base 54 and the stator coil 26, and include, for example, power lines 40a for supplying and receiving power to and from the three-phase coils, and neutral lines 40b that are connected to each other to form a neutral point. The plurality of lead wires 40 substantially are not dispersed in the circumferential direction, and extend from a range that is within an angle of approximately 50 degrees. In the following description, the range as viewed in the circumferential direction from which the plurality of lead wires 40 extend is referred to as "extension range E1." As can be seen from FIG. 2, the extension range E1 is located in an area between two attachment portions 32 that are adjacent to each other in the circumferential direction. No attachment portion 32 is present near the extension range E1.

The motor case includes the lower case 18 having an open upper end, and a case cover (not illustrated) for covering the upper end opening of the lower case 18. The lower case 18 houses the rotor 12 and the stator 16, and includes a case bottom surface 44 and a case circumferential wall 46 that stands upright from the case bottom surface 44. As illustrated in FIGS. 1 and 2, the case circumferential wall 46 has a shape that generally conforms to the outer circumferential shape of the stator core 24, and is substantially circular as viewed in a top view. However, the case circumferential wall 46 is significantly curved outward near the extension range E1 of the lead wires 40. The terminal base 54 is secured to this outwardly curved portion.

The case bottom surface 44 faces an end surface of the stator core 24 as viewed in the axial direction. The seat portions 48 are provided on the case bottom surface 44 at locations corresponding to the attachment portions 32 of the stator core 24 (see FIGS. 2 and 3). The seat portions 48 are projections partially projecting from the case bottom surface 44 and having a height that is sufficiently greater than the amount of projection of the coil end 36. The top surfaces of the seat portions 48 have internal threads to which the fastening bolts 58 are screwed. Each of the attachment portions 32 of the stator core 24 is placed on a corresponding one of the seat portions 48. As the seat portions 48 are sufficiently greater in height than the amount of projection of the coil end 36, the coil end 36 and the case bottom surface 44 are reliably prevented from interfering with each other. With this structure, portions of the bottom surface of the stator core 24 other than the attachment portions 32 are spaced apart from the case bottom surface 44. With this structure, as the stator core 24 is in contact only with the seat portions 48, the contact area of the stator core 24 and the lower case 18 can be minimized. As the contact area of the stator core 24 and the lower case 18 can be reduced, vibration or noise transferred between them can be reduced, and, in turn, vibration and noise characteristics of the whole rotary electric machine 10 can be improved.

Additionally, a support portion 50 on which a support plate 70, which will be described later, is placed, also projects from the case bottom surface 44. The support portion 50 is an island-like projection projecting from the case bottom surface 44. While FIG. 1 illustrates only one support portion 50, the actual structure includes a plurality of support portions 50 at positions corresponding to support plates 70.

As described above, the terminal base 54 is secured to the outwardly curved portion of the case circumferential wall 46. The terminal base 54 penetrates the case circumferential wall 46 (see FIG. 4), and relays electrical connection between the rotary electric machine 10 and an external electrical device. The terminal base 54 has a plurality of connection terminals in a portion located inside the motor case, and to each of the connection terminals, the tip of a corresponding one of the lead wires 40 is connected. Although the lead wires 40 and the connection terminals may be connected to each other in any manner, for example, they may be connected by swaging a terminal fitting having a substantially annular shaped tip to the tip of each of the lead wires 40, and screwing the terminal fitting to the connection terminal of the terminal base 54.

The rotary electric machine 10 disclosed in the present specification further includes a reinforcement plate 60 disposed on the top surface of the stator core 24 and the support plate 70 disposed on the bottom surface of the stator core 24. While the structure of these two plates 60 and 70 will be described later, a problem that would occur if the two plates 60 and 70 were absent will now be described below.

As described above, the stator core 24 is composed of a stack of a plurality of steel sheets. The plurality of steel sheets may be joined together only partially via, for example, the swage portions 34, rather than joining them overall using, for example, an adhesive; in this case, the individual steel sheets tend to flex. As the steel sheets are thin relative to their diameter, they tend to flex in the axial direction due to, for example, vibration. More specifically, the amount of flexure of sheet material typically is inversely proportional to the Young's modulus of the material, and further is inversely proportional to the cube of the sheet thickness. In other words, the thinner the sheets, the greater the amount of flexure.

However, this flexure of the steel sheets substantially does not occur near the attachment portions 32, because the stator core 24 is pressed between the heads of the fastening bolts 58 and the seat portions 48. On the other hand, the steel sheets tend to flex and vibrate in their thickness direction at intermediate positions between the attachment portions 32, because the stator core 24 is not bound at those positions. Such vibration of the stator core 24 (steel sheets) may cause, for example, deterioration of a component such as the lead wire 40 that is attached to the stator 16.

Figure 5:
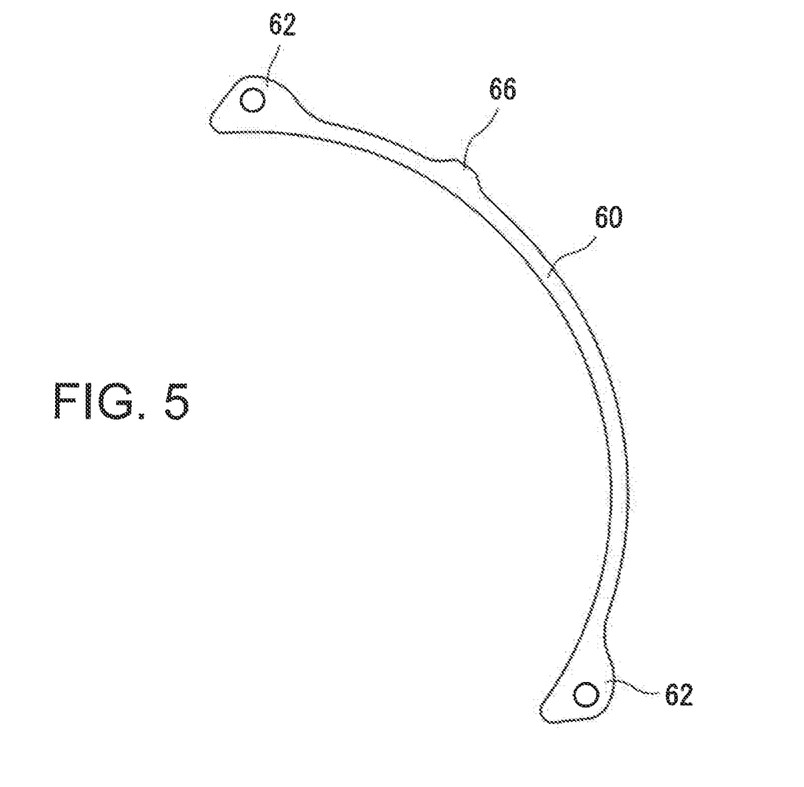
FIG. 5 is a top view of a reinforcement plate.
Figure 6:
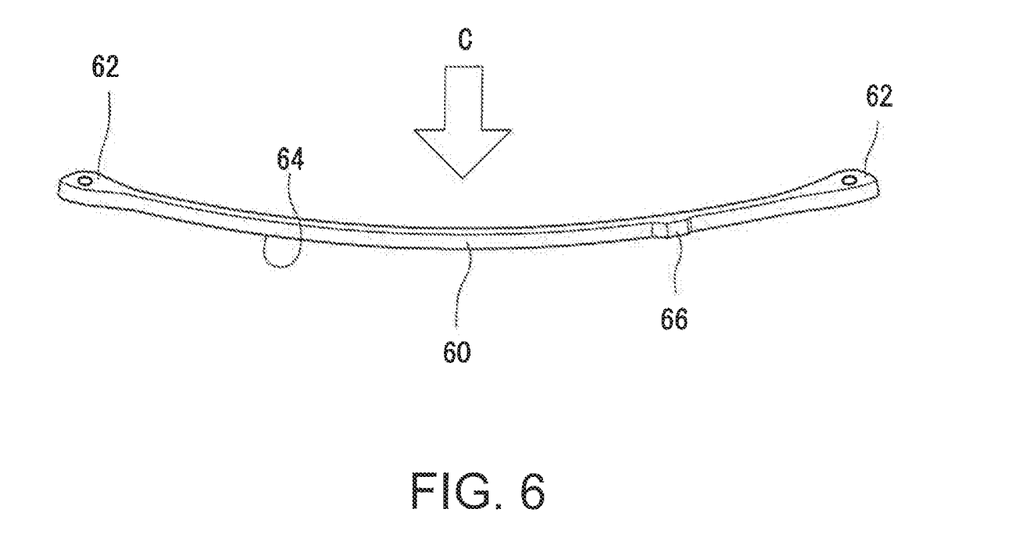
FIG. 6 illustrates the reinforcement plate as viewed from the side.

In the present specification, the reinforcement plate 60 is disposed on the top surface of the stator core 24 for suppressing such vibration of the steel sheets. FIG. 5 is a top view of the reinforcement plate 60. FIG. 6 illustrates the reinforcement plate 60 as viewed from the side.

The reinforcement plate 60 is less likely to flex in the axial direction than the steel sheets that form the stator core 24. As described above, the amount of flexure of sheet material is inversely proportional to the Young's modulus of the material, and is inversely proportional to the cube of the thickness of the sheet material. As such, the most effective way to obtain the reinforcement plate 60 that is less likely to flex than the steel sheets would be to use a plate having a thickness greater than that of the steel sheets. As such, the thickness of the reinforcement plate 60 is, for example, twice the thickness of the steel sheets or greater, more preferably five times or greater, and more preferably ten times or greater. A difference in Young's modulus also affects the amount of flexure, while its effect is less than that of the thickness. Therefore, in preferred embodiments, the reinforcement plate 60 is made of a material having a Young's modulus similar to that of the steel sheets, such as a metal material. Further, in preferred embodiments, to prevent leakage of magnetic flux, the reinforcement plate 60 is made of, for example, a non-magnetic material, such as stainless steel, brass, or aluminum.

The reinforcement plate 60 has a substantially arcuate shape extending from one attachment portion 32 along the yoke 28 passing through the extension range E1 to reach another attachment portion 32 that is adjacent in the circumferential direction. In other words, the reinforcement plate 60 does not extend along the entire circumference of the stator core 24 but extends only along a partial range. The reason that the reinforcement plate 60 has a shape extending only along a portion of the circumference in this manner is for material and cost reduction. However, the reinforcement plate 60 may have any shape that extends over at least two attachment portions 32. Further, the reinforcement plate 60 may have a shape that extends over three or more attachment portions 32. Still further, the reinforcement plate 60 may have a substantially annular shape extending along the entire circumference of the stator core 24. However, in any case, in preferred embodiments, the reinforcement plate 60 has a shape that spans a location where vibration of the stator core 24 should be particularly suppressed; that is, the extension range E1 of the lead wires 40 in the illustrated example.

At positions of the reinforcement plate 60 corresponding to the attachment portions 32 (in the illustrated example, at both ends of the reinforcement plate 60 as viewed in the circumferential direction), the reinforcement plate 60 includes tabs 62 each having a substantially chevron-like shape projecting outward in the radial direction in a similar manner as with the attachment portions 32. At positions of the tabs 62 corresponding to the fastening holes 32a, the tabs 62 similarly include through-holes. The reinforcement plate 60 is fastened together with the stator core 24 by the fastening bolts 58 that are inserted through these through-holes and the fastening holes 32a.

In other words, at the tabs 62 and the attachment portions 32, the reinforcement plate 60 and the stator core 24 are pressed between the heads of the fastening bolts 58 and the seat portions 48 of the lower case 18. As a result, at the tabs 62, the reinforcement plate 60 is restricted from moving with respect to the lower case 18. As described above, the reinforcement plate 60 does not substantially flex, as its thickness is sufficient. As a result, the reinforcement plate 60 also does not substantially flex at an intermediate position between adjacent tabs 62, for example, near the extension range E1.

In a structure wherein the reinforcement plate 60 that does not substantially flex as described above is disposed on the top surface of the stator core 24, the reinforcement plate 60 inhibits upward flexing of the steel sheets that form the stator core 24. As a result, vibration of the stator core 24 is suppressed. Because the reinforcement plate 60 is placed in the circumferential direction across the extension range E1 from which the lead wires 40 extend, vibration of the stator core 24 in the extension range E1 is suppressed, and deterioration or poor connection of the lead wires 40 is prevented effectively.

To prevent upward flexing of the steel sheets, the entire surface of the reinforcement plate 60 should be in contact with the top surface of the stator core 24. For example, if a portion of the reinforcement plate 60 as viewed in the circumferential direction is out of contact with the stator core 24, upward flexure of the steel sheets may occur in that portion. To address this situation, the flatness of the reinforcement plate 60 may be kept at a high level so as to reliably maintain the entire surface of the reinforcement plate 60 in contact with the stator core 24. However, keeping the flatness of the reinforcement plate 60 at a high level complicates the manufacturing process, increases costs, and causes other problems.

To address this situation, in the rotary electric machine 10 disclosed in the present specification, the reinforcement plate 60 is disposed such that a convex curve 64 of the reinforcement plate 60 is a surface that comes in contact with the top surface of the stator core 24. Typically, the reinforcement plate 60 is formed by press-stamping a material sheet. The reinforcement plate 60 formed in this manner is curved in the circumferential direction under no load (before it is attached to the stator core 24) such that it is convex in the stamping direction C (toward one side as viewed in the thickness direction), as illustrated in FIG. 6. The reinforcement plate 60 is disposed such that the convex surface (the surface located on one side as viewed in the thickness direction) comes in contact with the top surface of the stator core 24; that is, the convex curve 64 (the bottom surface in FIG. 6) comes in contact with the top surface of the stator core 24. In this case, pressing and fastening both ends of the reinforcement plate 60 that are curved upward in the circumferential direction against the attachment portions 32 of the stator core 24 spontaneously turns the entire reinforcement plate 60 into a correct shape that comes in contact with the top surface of the stator core 24. In other words, as the convex curve 64 of the reinforcement plate 60 is a surface that comes in contact with the stator core 24, the entire reinforcement plate 60 can come in contact with the stator core 24 even if the flatness of the reinforcement plate 60 is low. As a result, vibration of the stator core 24 can be suppressed effectively without an increase in cost.

It should be understood that, if the reinforcement plate 60 is attached upside down; in other words, if the reinforcement plate 60 is attached with the convex curve 64 facing up, vibration of the stator core 24 cannot be suppressed sufficiently. To address this situation, the reinforcement plate 60 includes a check portion 66 to prevent erroneous, upside-down attachment of the reinforcement plate 60. The check portion 66 is a portion that projects outward in the radial direction from the outer circumferential edge of the body of the reinforcement plate 60 having a substantially arcuate shape. The check portion 66 is located at a position and is of a size such that it does not interfere with the lower case 18 when the reinforcement plate 60 is attached in correct orientation and such that it interferes with a portion of the lower case 18 when the reinforcement plate 60 is attached upside down. As the check portion 66 is included as described above, erroneous, upside-down attachment of the reinforcement plate 60 can be prevented effectively.

Figure 7:
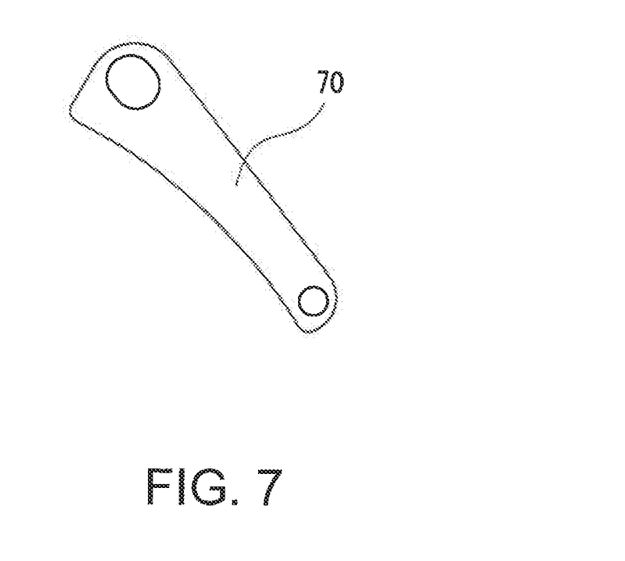
FIG. 7 is a top view of a support plate.

The rotary electric machine 10 further includes the support plate 70. FIG. 7 is a top view of the support plate 70. Similar to the reinforcement plate 60, the support plate 70 also is less likely to flex in the axial direction than the steel sheets that form the stator core 24. As such, in preferred embodiments, the support plate 70 has a thickness that is, for example, twice the thickness of the steel sheets or greater, more preferably five times or greater, and more preferably ten times or greater. Further, in preferred embodiments, the support plate 70 is made of a non-magnetic metal material, such as stainless steel, brass, or aluminum.

The support plate 70 is placed on the support portion 50 projecting from the case bottom surface 44, and is screwed to the support portion 50. The stator core 24 is placed on the support plate 70. A range corresponding to the support plate 70 as viewed in the circumferential direction is approximately the same as a range corresponding to the extension range E1 as viewed in the circumferential direction. As such, only a portion of the stator core 24 corresponding to the extension range E1 is pressed between the support plate 70 and the reinforcement plate 60. As the stator core 24 is pressed between the support plate 70 and the reinforcement plate 60 as described above, flexure of the steel sheets that form the stator core 24 can be prevented more reliably, and, in turn, deterioration or poor connection of the lead wires 40 can be prevented more reliably.

The length of the support plate 70 as viewed in the circumferential direction is less than the length of the reinforcement plate 60 as viewed in the circumferential direction. The reason that the entire size of the support plate 70 is reduced as described above is for reduction of the amount of vibration and noise transfer between the stator 16 and the lower case 18. As the support plate 70 is a component interposed between the stator core 24 and the lower case 18, the greater the contact area between the support plate 70 and the stator core 24, the greater the vibration and noise transferred between the stator core 24 and the lower case 18. To address this situation, the range corresponding to the support plate 70 as viewed in the circumferential direction is minimized to a location where vibration should be suppressed; that is, approximately the same range as the extension range E1 of the lead wires 40, in order to prevent an increase in the contact area of the support plate 70 and the stator core 24.

As can be understood from the foregoing description, in the rotary electric machine 10 disclosed in the present specification, the reinforcement plate 60 and the support plate 70 that are less likely to flex than the steel sheets that form the stator core 24 press the end surfaces of the stator core 24 as viewed in the axial direction. With this structure, flexure of the steel sheets can be suppressed, and, in turn, vibration of the stator core 24 can be suppressed. It should be noted that specific features described above are given by way of example; at least the reinforcement plate 60 that is less likely to flex than the steel sheets is disposed, and the remaining features may be modified as desired. For example, although the above-described structure includes the support plate 70, the support plate 70 does not have to be provided. In a structure that does not include the support plate 70, the lower case 18 may have a projection for supporting a location of the stator core 24 corresponding to the extension range E1 in place of the support plate 70. In a structure that includes neither such a projection nor the support plate 70, the bottom surface of the stator core 24 other than portions corresponding to the seat portions 48 may be held in a contactless state. In this structure, the reinforcement plate 60 disposed on the top surface of the stator core 24 inhibits upward flexing of the steel sheets, and therefore suppresses vibration of the stator core 24 effectively.

Although, in the structure described above, the reinforcement plate 60 is fastened together with the stator core 24 by the fastening bolts 58, the reinforcement plate 60 may be fixed to the stator core 24 near the attachment portions 32 of the stator core 24 without being fastened together. For example, the reinforcement plate 60 may be swaged to the stator core 24 near the attachment portions 32 of the stator core 24.

The invention claimed is:

1. A rotary electric machine, comprising:
    a stator including a stator core composed of a plurality of steel sheets stacked in an axial direction and a stator coil wound on the stator core;
    a rotor disposed to be concentric with the stator;
    a case that houses the stator and the rotor, the case having two or more seat portions on which portions of the stator core are seated; and
    a reinforcement plate interior to the case and fixed to a first end of the stator core as viewed in the axial direction,
    wherein the stator core includes two or more attachment portions disposed at an interval in a circumferential direction, the two or more attachment portions being seated and fixed on the seat portions, and
    wherein the reinforcement plate is less likely to flex in the axial direction than the steel sheets individually, and is fixed on the first end of the stator core as viewed in the axial direction so as to extend over at least two of the attachment portions.

2. The rotary electric machine according to claim 1, further comprising:
    a terminal base attached to the case; and
    a plurality of lead wires that extend from a coil end of the stator coil located toward the first end as viewed in the axial direction and are joined to the terminal base,
    wherein the plurality of lead wires extend from the coil end in an extension range located between two seat portions that are adjacent to each other in the circumferential direction, and
    wherein the reinforcement plate spans the extension range.

3. The rotary electric machine according to claim 2,
    wherein the seat portions are projections partially projecting from an opposing surface of the case that faces a surface on a second end of the stator core as viewed in the axial direction, and
    wherein a portion of the surface on the second end of the stator core as viewed in the axial direction is spaced apart from the opposing surface of the case.

4. The rotary electric machine according to claim 3, further comprising:
    a support plate that is less likely to flex in the axial direction than the steel sheets individually,
    wherein the support plate is disposed opposite the reinforcement plate in the axial direction with the stator core interposed therebetween so that the stator core is pressed between the support plate and the reinforcement plate, the support plate having a portion that is fixed to the opposing surface of the case.

5. The rotary electric machine according to claim 4, wherein a range corresponding to the support plate as viewed in the circumferential direction is approximately the same as a range corresponding to the extension range as viewed in the circumferential direction.

6. The rotary electric machine according to any one of claims 2, wherein the reinforcement plate has a substantially arcuate shape that extends over the two seat portions located on both sides of the extension range as viewed in the circumferential direction.

7. The rotary electric machine according to claim 5,
    wherein the reinforcement plate is curved in the circumferential direction under no load such that the reinforcement plate is convex toward a first side as viewed in a thickness direction, and
    wherein the reinforcement plate is fixed such that a surface of the reinforcement plate located on the first side as viewed in the thickness direction is in contact with the stator core.

8. The rotary electric machine according to claim 1, wherein the reinforcement plate restrains the plurality of steel sheets.

9. The rotary electric machine according to claim 1, wherein the reinforcement plate restrains the plurality of steel sheets at an outer circumference of the steel sheets.

10. The rotary electric machine according to claim 1, wherein the reinforcement plate abuts one of the steel sheets.

11. The rotary electric machine according to claim 1, wherein the reinforcement plate abuts one of the steel sheets at an outer circumference of the one of the steel sheets.

12. The rotary electric machine according to claim 1, wherein the reinforcement plate does not extend around an entire circumference of the plurality of steel sheets.

13. The rotary electric machine according to claim 2, wherein the reinforcement plate does not extend around an entire circumference of the plurality of steel sheets.

14. The rotary electric machine according to claim 2, wherein the case includes a radially outward extension at the extension range to accommodate the plurality of lead wires.

15. The rotary electric machine according to claim 14, wherein the reinforcement plate does not extend around an entire circumference of the plurality of steel sheets.

* * * * *